United States Patent [19]

Callerame

[11] Patent Number: 4,877,500
[45] Date of Patent: Oct. 31, 1989

[54] PROCESS FOR THE PRODUCTION OF CHLORINE DIOXIDE

[76] Inventor: Joseph Callerame, 2220 Casper Dr., Lake Havasu City, Ariz. 86403

[21] Appl. No.: 213,543

[22] Filed: Jun. 30, 1988

[51] Int. Cl.⁴ .................... B01J 19/08; C01B 11/02
[52] U.S. Cl. ............................ 204/157.48; 204/157.5; 423/477
[58] Field of Search ........... 204/157.4, 157.41, 157.48, 204/157.5; 423/477

[56] References Cited

U.S. PATENT DOCUMENTS

| | | | |
|---|---|---|---|
| 3,429,793 | 2/1969 | Hellund | 204/157.48 |
| 3,629,081 | 12/1971 | Carpenter | 204/157.48 |
| 3,684,437 | 8/1972 | Callerame | 423/477 |
| 4,414,180 | 11/1983 | Fisher | 204/157.48 |

Primary Examiner—John F. Niebling
Assistant Examiner—Ben C. Hsing
Attorney, Agent, or Firm—Toren, McGeady & Associates

[57] ABSTRACT

Chlorine dioxide is produced by subjecting a mixture of chlorine gas and oxygen to ultraviolet radiation. The source for chlorine and oxygen may be an alkali metal or alkaline metal hypochlorite.

10 Claims, 1 Drawing Sheet

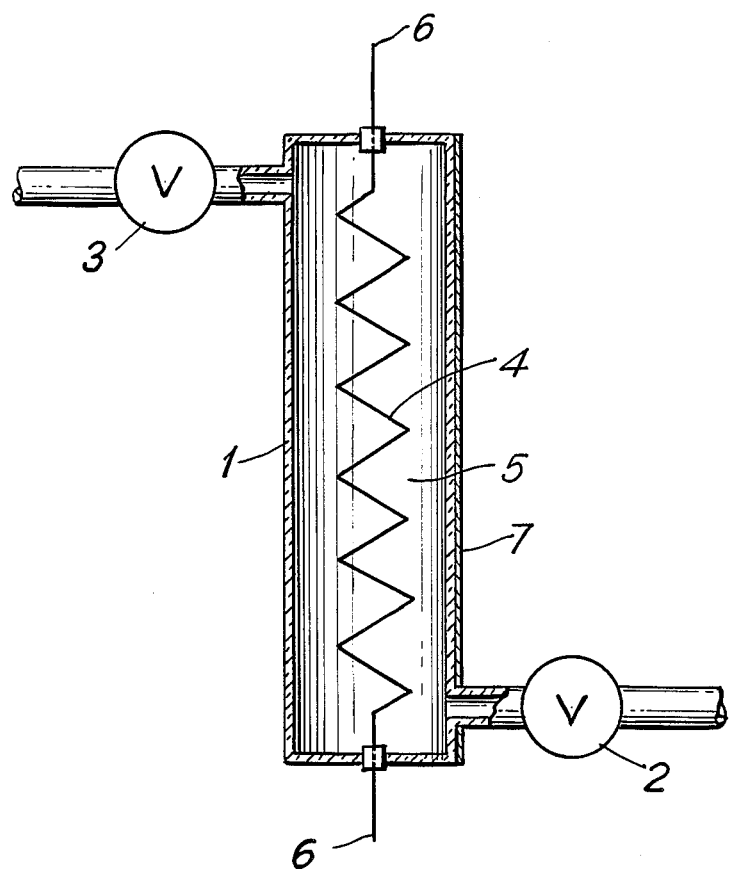

PROCESS FOR THE PRODUCTION OF CHLORINE DIOXIDE

FIELD OF THE INVENTION

The present invention relates generally to chlorine dioxide and is particularly directed to a process of producing chlorine dioxide from readily available raw materials.

BACKGROUND OF THE INFORMATION AND PRIOR ART

Chlorine dioxide is of considerable industrial importance and has found use as a disinfectant and in the bleaching of wood pulp, fats, oils and flour. Generally, chlorine dioxide is used as a bleaching agent and for removing tastes and odors from water and the like liquids. More recently, it has been used as an anti-pollutant.

For several of the established uses of the chlorine dioxide, it is desirable to produce the gas in situ so that the chlorine dioxide, upon formation, can be directly put to use either in gaseous form or, after absorption, in the form of an aqueous solution. In many instances, the use of chlorine dioxide solution rather than in the gaseous form is preferred. Chlorine dioxide is absorbed in water and forms chlorous acid, from which the gas can be readily expelled by heating. The presence of chlorous acid in an aqueous solution indicates a reaction of chlorine dioxide with water.

Several processes have previously been proposed for producing chlorine dioxide. Attention is thus directed to U.S. Pat. Nos. 3,684,437, 3,695,839, 3,828,097 and 3,754,079, all of which are directed to the production of chlorine dioxide or chlorous acid from which the chlorine dioxide can be expelled.

OBJECTS OF THE INVENTION

It is a primary object of the present invention to provide a simple process for the production of chlorine dioxide from readily available raw materials.

Generally, it is an object of the invention to improve on the art of chlorine dioxide production as previously practiced.

SUMMARY OF THE INVENTION

Surprisingly, it has been ascertained that chlorine dioxide is produced by subjecting a mixture of oxygen gas and chlorine gas to ultraviolet radiation. The reaction is preferably carried out in a reaction space devoid of nitrogen. The presence of nitrogen does not prevent the formation of the chlorine dioxide, but nitrogenous chlorine-containing compounds are then also formed as by-products. This lowers the yield of chlorine dioxide and is, of course, undesired. The yield of chlorine dioxide obtained by exposing the chlorine-oxygen gas mixture to ultraviolet radiation is a function of the exposure time, the intensity of the radiation and the ratio of the reactants. Since chlorine dioxide gas at higher concentrations has explosive properties, the above parameters should be chosen such that its concentration in the reaction mixture does not exceed about 10%.

The inventive process is advantageously carried out in situ. The chlorine dioxide formed need not be separated from the reaction mixture, but the entire reaction mixture, including the chlorine dioxide formed, may rather, in most instances, be used as a whole since the other components of the reaction do not exert a detrimental influence on the application properties. Thus the chlorine dioxide containing reaction product obtained as a result of the ultraviolet radiation may be expelled from the reaction space and conveyed to a place of use, or, if desired, after completion of the reaction, the reaction mixture may be passed through water to form dissolved chlorine dioxide or chlorous acid.

A particularly advantageous feature of the present process is that the reaction parameters, including the ratio of the reactants, can be easily regulated so that chlorine dioxide free of unreacted chlorine is formed.

Although Applicant does not wish to be limited to any theories advanced by him, it is reasonable to refer to the reaction as photooxygenation of chlorine.

Considered from another aspect, the invention provides for the production of chlorine dioxide by subjecting an aqueous hypochlorite containing solution, such as an alkali metal hypochlorite solution or an alkaline earth metal hypochlorite solution to ultraviolet radiation. The hypochlorite is a source both for the oxygen and the chlorine.

DESCRIPTION OF THE DRAWING

The single figure of the drawing is a diagrammatic rendering of apparatus for producing chlorine dioxide in accordance with the present invention.

DETAILED DESCRIPTION OF THE DRAWING

The process may be carried out in the type of reactor shown in the drawing. The reactor comprises a tubular vessel 1 having a valve-controlled bottom inlet 2 and a valve-controlled top exit 3. The tubular vessel is made of glass, titanium or a steel alloy, such as known under the name Hastalloy C. An ultraviolet radiation source, such an one or several quartz lamps 4, is arranged within the space 5 defined by the tubular vessel 1. Although the quartz lamp is shown to have a twisted shape, it will be appreciated that other shapes, such as U-shaped quartz lamps, may also be used. The electrical connections for the quartz lamp are diagrammatically indicated by reference numeral 6. If the wall material of the tubular vessel 1 is UV radiation transmitting, the UV source may be arranged outside the vessel.

In order to enhance and contain the ultraviolet radiation emitted by the lamp, and if the reactor wall transmits UV radiation, it is advantageous to provide a shiny reflector, such as of aluminum, at the outside of the tubular vessel 1. Such a reflector is generally indicated in the drawing by reference numeral 7. The reflector may be arranged within the reaction space if it has a surface coating resistant to the reactants.

As a general proposition, the reactor wall material should be of the UV transmitting kind. If the UV source is arranged outside the reactor space, but may be non-transmitting if the light source is located within the reactor space. The wall may thus be of glass, plastic, steel alloy or titanium, provided the material is resistant to the reactants. As stated, a highly polished aluminum reflector should advantageously be used to contain the intensity of the radiation in the chamber space of the reactor if the material transmits UV radiation.

The invention will now be described by several examples and experimental data, it being understood that this information is furnished by way of illustration only and not by way of limitation.

Experimental Series I: Photooxygenation

This experiment was carried out with the reactor or apparatus shown in the figure.

The space 5 of the reactor vessel 1 was flushed with oxygen, introduced through inlet 2 to replace the air atmosphere in the reactor. Gaseous chlorine and gaseous oxygen were thereafter introduced into the chamber space through inlet 2 and the quartz lamp was switched on to expose the chlorine-oxygen mixture to ultraviolet radiation. The radiation emitted by the lamp had a constant intensity of 40,000 microwatts/square centimeter at 254 nanometers at 1 inch. The reference to "1 inch" indicates the distance from the center of illumination where the rated intensity is measured. The gas mixture was subjected to the radiation for 5 minutes. The reaction mixture within the chamber space was then expelled by flowing oxygen gas through the chamber and the expelled gas mixture was collected through the outlet 3 and analyzed for content. The analysis was effected by spectrophotometry and correlated with amphoteric titration. The presence of chlorine dioxide was thus established by observing the distinct absorbance peak of chloride dioxide. The results were confirmed by titration. The procedure was repeated several times with different ratios of chlorine gas to oxygen gas to determine the most favorable ratio of reactants and also to establish the range of ratios which provides chlorine dioxide free of unreacted chlorine.

Each of the experiments was repeated several times to verify the reproducibility and correctness of the results. The results are tabulated in the following Table I. Additional tests were run to determine the optimum exposure time/radiation intensity (Table II).

Additional tests were run in which observed optimum results were related to the effect of temperature and pressure on the reaction (Table III).

Constant wavelengths of 254 nanometers were maintained during the experiments without ozone producing interfering wavelengths. If desired, several lamps may be used as a UV radiation source. In one series of experiments, two lamps were used, each being rated at 20,000 microwatts/square centimeter at 1 inch. However, it is possible to use lamps rated at 4,000 microwatts/square centimeters or less, in which event, up to 10 or even more lamps may be used.

Again, Applicant does not wish to be limited to any theories, but it is reasonable to conclude that the reaction proceeds as follows:

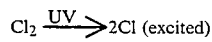

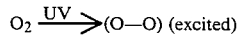

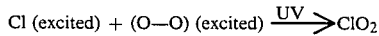

No free chlorine is formed in this reaction and none was detected.

Experimental Series II

In this experimental series, the gaseous chlorine was replaced by chlorine water which was produced by dissolving gaseous chlorine in distilled water to a concentration of 2% w/v. The solution was introduced into the reaction spaces and was subjected to ultraviolet radiation of an intensity of 20,000 microwatts/centimeters while gaseous oxygen was bubbled through the chlorine water. The resulting solution was then analyzed for chlorine dioxide content at different exposure times. The results are tabulated in Table IV. Chlorine dioxide and chlorine were measured by their absorbance peaks and compared to standard concentrations.

The above experiment was repeated with the chlorine gas dissolved in a saline solution (physiological salt solution) with no apparent change in yield. (See Table V).

The UV intensity was increased to 40,000 microwatts/centimeter at 1 inch and 254 nm (Table VII). This resulted in a stable yield at somewhat decreased exposure time. No chlorine was detected. It was also established that an increase in the concentration of the reactants does not appreciably alter the kinetics of the reaction.

Experiment III

Production of Chlorine Dioxide from Hypochlorite Solution

A 3% aqueous solution of sodium hypochlorite was acidified and diluted with water to form a 1.5% solution. The solution was then exposed to UV radiation in the space 5 at 20,000 microwatts/square centimeter at 1 inch with a wavelength of 254 nm. The exposure time was 1 minute. A 1.4% solution of chlorine dioxide was obtained. The procedure was repeated several times to establish its reproducibility. No free chlorine was detected. If desired, small amounts of extraneous oxygen may be added.

It is believed that the reaction proceeds as follows:

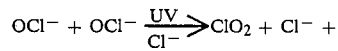

It was established that corresponding results were obtained with other alkali metal or alkaline earth metal hypochlorites.

Experiment IV: Stability

Experiment I was repeated to obtain different concentrations of chlorine dioxide in the oxygen atmosphere. Expected results were obtained until the chlorine dioxide concentration approached about 8%. At 11% concentration, an explosion occurred in two instances. The instability of the kinetics after a concentration of 8% had been reached might indicate an inherent instability due to bond acceptance of electrons under continuous UV radiation or donation of electrons to another acceptor to produce a high oxygenation of chlorine with a reduction of the 0—0 bond distance, thus making the reaction reversible and unstable at high concentrations. (See Table IV) Accordingly, the parameters should be chosen so that the chlorine dioxide concentration does not exceed about 10%.

As will be appreciated from the above, excited oxygen and excited chlorine combine to form chlorine dioxide.

Excited C12 may remove electrons without breaking the (0—0) bond to form chlorine dioxide. It is believed that the reaction corresponds to oxygenation rather than oxidation, with the distance of the dioxygen bond being increased during the radiation with UV.

Excited chlorine is produced by ultraviolet radiation.

Excited (0—0) is produced by UV radiation. The (0—0) bond distance may be increased by UV radiation from 1.30 A to 1.62 depending on the intensity of the radiation.

Chlorine (excited) and oxygen combined best in an oxygen intensive concentration. The presence of nitrogen lowers the yield, but does not stop the reaction.

The chlorine dioxide recovery or yield is a direct function of the exposure time.

The exposure time, in turn, is dependent on the intensity of the UV source.

Temperature and pressure do not directly affect the kinetics of the reaction. However, they may impede or increase UV penetration. Extreme temperatures and reduced pressure may lead to the disassociation or transference of electrons to another acceptor. This may lead to the formation of perchlorates. In Experiment IV, some changes in the kinetics due to higher concentrations of chlorine and oxygen can be observed, and it can be assumed that extreme temperatures and pressure changes will lead to internal energy changes which, in turn, in a limited volume, increase the instability of the reaction.

No chlorine dioxide formation was observed in the absence of ultraviolet radiation.

Advantages

1. Economy: only chlorine, oxygen and a low cost energy system are required. A cryogenic compressor-diffusion apparatus can be used for the oxygen source; the chlorine source can be gaseous, dissolved in water, or hypochlorite.
2. Chlorine and oxygen do not normally react with one another at any concentration ratio.
3. In the photooxygenation of chlorine, chlorine dioxide can be produced free of chlorine.
4. No other by-product other than excess oxygen is produced.
5. This system can be added easily to existing chlorine installations for chlorine dioxide conversion of that system.
6. Low capital costs for the system.
7. There is no pH dependency.
8. The reaction does not require any pre-preparation of the gases such as drying; however, the oxygen should be free of nitrogen, since nitrogen will remove chlorine from the reaction by combination.
9. The chlorine dioxide produced requires no separation or displacement step.
10. The chlorine source can be gaseous, dissolved in water, or in its hypochlorite form.
11. The chlorine dioxide produced by photooxygenation goes through a valence change of 5 going to chloride. Chlorites go through a valence change of 4 going to chloride.
12. Photooxygenation of chlorine occurs with minute amounts of reactants as well as large volumes of reactants.
13. The reaction is highly efficient with excellent yield characteristics.

Experiment I

TABLE I

Ratio of reactants flowing through reactor; UV intensity: 40,000 microwatts/square centimeter, temperature: 37° C.; pressure: 1 atmosphere; 5 minutes exposure time.

| Ratio of Reactants | | |
|---|---|---|
| $O_2/Cl_2$ | % of Cl Converted Into $ClO_2$ | % of Unreacted Chlorine |
| 0:1 | 10 | 83 |

TABLE I-continued

Ratio of reactants flowing through reactor; UV intensity: 40,000 microwatts/square centimeter, temperature: 37° C.; pressure: 1 atmosphere; 5 minutes exposure time.

| Ratio of Reactants | | |
|---|---|---|
| $O_2/Cl_2$ | % of Cl Converted Into $ClO_2$ | % of Unreacted Chlorine |
| 1:1 | 28 | 61 |
| 2:1 | 47 | 31 |
| 3:1 | 85 | trace |
| 4:1 | 90 | 0 |
| 5:1 | 90+ | 0 |
| 9:1 | 90+ | 0 |
| 10:1 | 90+ | 0 |

Experiment I

TABLE II

Effects of UV Intensity and Exposure Time

| Exposure in Seconds | Yield of $ClO_2$ (parts/weight) at 4,000 microwatts/sq. cm | Yield of $ClO_2$ (parts/weight) at 20,000 microwatts/sq. cm | Yield of $ClO_2$ (parts/weight) at 40,000 microwatts/sq. cm |
|---|---|---|---|
| 0 | 0 | 0 | 0 |
| 30 | 0.5 | 1.0 | 1.8 |
| 60 | 0.9 | 2.0 | 3.0 |
| 90 | 1.0 | 2.5 | 3.6 |
| 120 | 1.2 | 3.0 | 4.0 |
| 150 | 1.5 | 3.5 | 4.0 |
| 180 | 1.8 | 3.7 | 4.0 |
| 200 | 2.0 | 4.0 | 4.0 |
| 300 | 2.2 | 4.0 | 4.0 |
| 360 | 2.8 | 4.0 | 4.0 |

Experiment I

TABLE III

| Temperature °C. | Parts $ClO_2$ formed at ½ atmosphere | Parts $ClO_2$ formed at 1 atmosphere | Parts $ClO_2$ formed at 2 atmosphere |
|---|---|---|---|
| 0 | 3.0 | 3.1 | 3.3 |
| 10 | 3.4 | 4.0 | 4.0 |
| 20 | 3.3 | 4.0 | 4.2 |
| 30 | 4.0 | 3.8 | 3.3 |
| 40 | 4.1 | 3.2 | 3.8 |
| 50 | 4.1 | 4.0 | 3.3 |
| 60 | 4.2 | 4.0 | 3.4 |
| 70 | 4.7 | 4.0 | 4.0 |

Experiment I

TABLE IV

Study of kinetics of high concentrations of $ClO_2$ produced by the photooxygenation of chlorine gas with oxygen gas at 40,000 microwatts/square centimeter of UV energy in a closed chamber free of nitrogen at 3 minute exposure.
The recovery of $ClO_2$ was compared to the calculated yield of chlorine and oxygen based on extrapolation from previous experiments and the concentration of the reactants.

| Calculated $ClO_2$ formed % w/v | Analyzed Recovery of $ClO_2$ % w/v | Analyzed Recovery of $ClO_2$ % w/v |
|---|---|---|
| 0 | 0 | 0 |
| 1 | 1.5 | 0 |
| 2 | 2 | 0 |
| 3 | 3.1 | 0 |
| 4 | 4.2 | 0 |
| 5 | 5.0 | 0 |
| 6 | 6.1 | 0 |
| 7 | 7.2 | 0 |
| 8 | 7.7 | 0 |
| >8, <9 | 7.5 | 0 |
| 9 | 7.5 | 0 |
| >9, <10 | 8.6 | 0 |

TABLE IV-continued

Study of kinetics of high concentrations of $ClO_2$ produced by the photooxygenation of chlorine gas with oxygen gas at 40,000 microwatts/square centimeter of UV energy in a closed chamber free of nitrogen at 3 minute exposure. The recovery of $ClO_2$ was compared to the calculated yield of chlorine and oxygen based on extrapolation from previous experiments and the concentration of the reactants.

| Calculated $ClO_2$ formed % w/v | Analyzed Recovery of $ClO_2$ % w/v | Analyzed Recovery of $ClO_2$ % w/v |
|---|---|---|
| 10 | 7 | 0 |
| 11 | 6 | 0 |
| >11, <12 | 5.8 (violent reaction) | 0 |
| 12 | 5.8 | 0 |

Experiment: Photooxygenation

TABLE V

| Exposure Time | $Cl_2$ % w/v | $O_2$ L/min. | UV Rad. mWatts/ sq. cm. | $ClO_2$ Conc. Recov. | $Cl_2$ Conc. Recov. |
|---|---|---|---|---|---|
| 0 | 2 | 1 | 0 | 0 | 98 |
| 30 sec | 2 | 1 | 20K | 62 | 30 |
| 45 sec | 2 | 1 | 20K | 93 | 0 |
| 60 sec | 2 | 1 | 20K | 92 | 0 |
| 120 sec | 2 | 1 | 20K | 94 | 0 |

TABLE VI

| Exposure Time In Seconds | $Cl_2$ % w/v | NaCl % w/v | $O_2$ L/mn | UV Rad. mWatts/ sq. cm. | $ClO_2$ % Conc. | $Cl_2$ % Recov. |
|---|---|---|---|---|---|---|
| 0 | 2 | 0.9 | 1 | 0 | 0 | 99 |
| 30 | 2 | 0.9 | 1 | 20K | 67 | 32 |
| 45 | 2 | 0.9 | 1 | 20K | 94 | 0 |
| 60 | 2 | 0.9 | 1 | 20K | 90 | 0 |
| 120 | 2 | 0.9 | 1 | 20K | 96 | 0 |

TABLE VII

| Exposure Time In Seconds | $Cl_2$ 5 w/v (1) | $Cl_2$ 5 w/v (2) | UV Rad. mWatts/ sq. cm. | $O_2$ L/mn. | $ClO_2$ % Conc. (1) | $ClO_2$ % Conc. (2) | $ClO_2$ % Conc. (1) | $ClO_2$ % Conc. (2) |
|---|---|---|---|---|---|---|---|---|
| 0 | 1 | 4 | 0 | 1 | 0 | 0 | 97 | 96 |
| 30 | 1 | 4 | 40K | 1 | 90 | 92 | 1 | 3 |
| 45 | 1 | 4 | 40K | 1 | 91 | 94 | 0 | 0 |
| 60 | 1 | 4 | 40K | 1 | 93 | 92 | 0 | 0 |
| 120 | 1 | 4 | 40K | 1 | 90 | 95 | 0 | 0 |

What is claimed is:

1. Process of producing chlorine dioxide which comprises introducing chlorine gas and oxygen gas into a reaction space to form a reaction mixture and subjecting the reaction mixture thus obtained to ultraviolet radiation at a temperature at which chlorine is in the gaseous form.

2. The process as claimed in claim 1, wherein the reaction mixture is subjected to ultraviolet radiation at a temperature of about 0° to 70° C.

3. A process as claimed in claim 1, wherein the chlorine gas, prior to being introduced into said reaction space, is dissolved in water or saline water.

4. A process as claimed in claim 1 or 3, wherein the ultraviolet radiation is discontinued when the chlorine dioxide concentration in the reaction space is about 10% by weight of the reaction.

5. A process as claimed in claim 1 or 3, wherein the chlorine dioxide obtained as a result of the ultraviolet radiation is expelled from the reaction space and conveyed to a place of use.

6. A process as claimed in claim 1 or 3, wherein the chlorine dioxide obtained as a result of the ultraviolet radiation is expelled from said reaction space and introduced into water to form chlorous acid.

7. A process as claimed in claim 1 or 3, wherein said reaction space is essentially devoid of nitrogen.

8. A process of producing chlorine dioxide which comprises subjecting a hypochlorite containing aqueous solution to ultraviolet radiation and recovering the chlorine dioxide thus formed or conducting it to a place of use.

9. A process as claimed in claim 8, wherein said hypochlorite is an alkali metal hypochlorite or an alkaline earth metal hypochlorite.

10. A process as claimed in claim 8 or 9, wherein the solution is subjected to the ultraviolet radiation in the absence of nitrogen.

* * * * *